United States Patent Office 3,189,386
Patented June 15, 1965

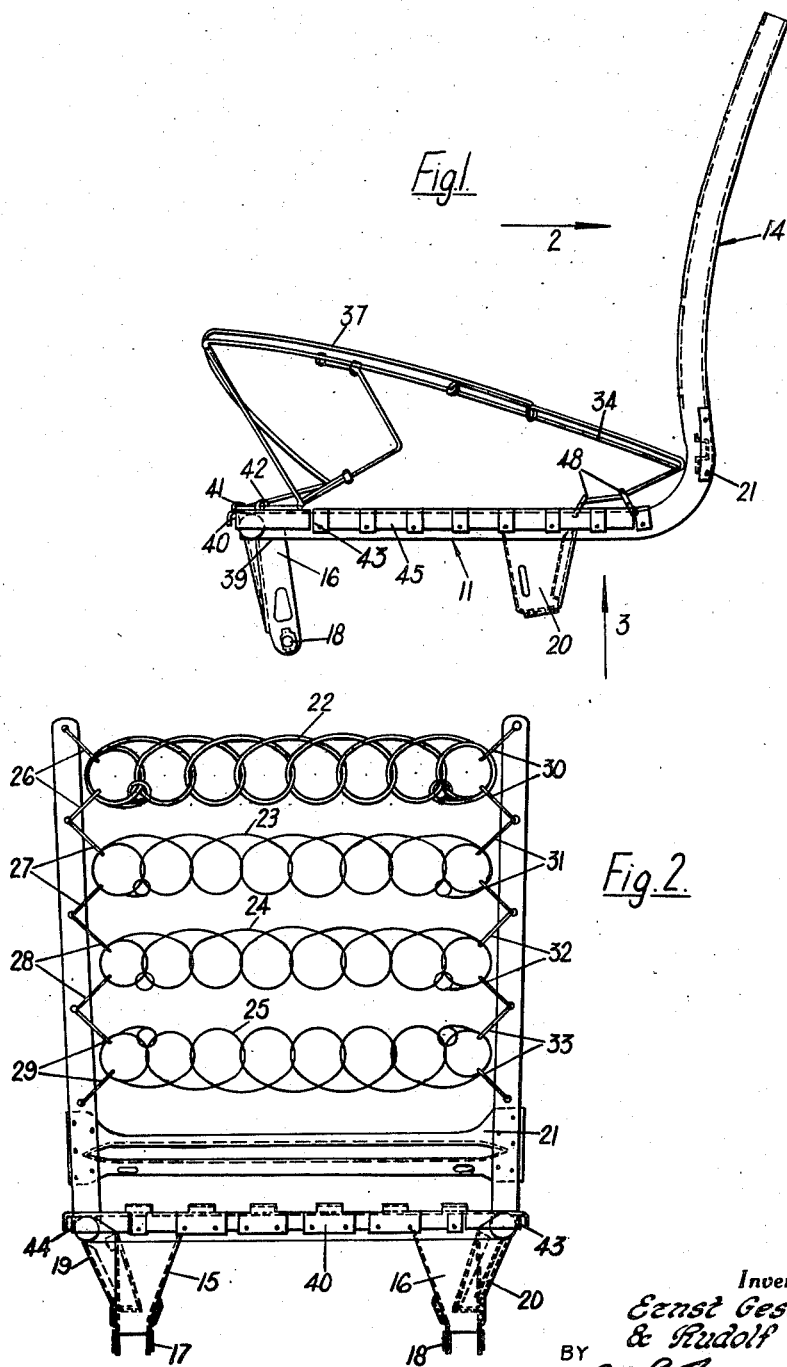

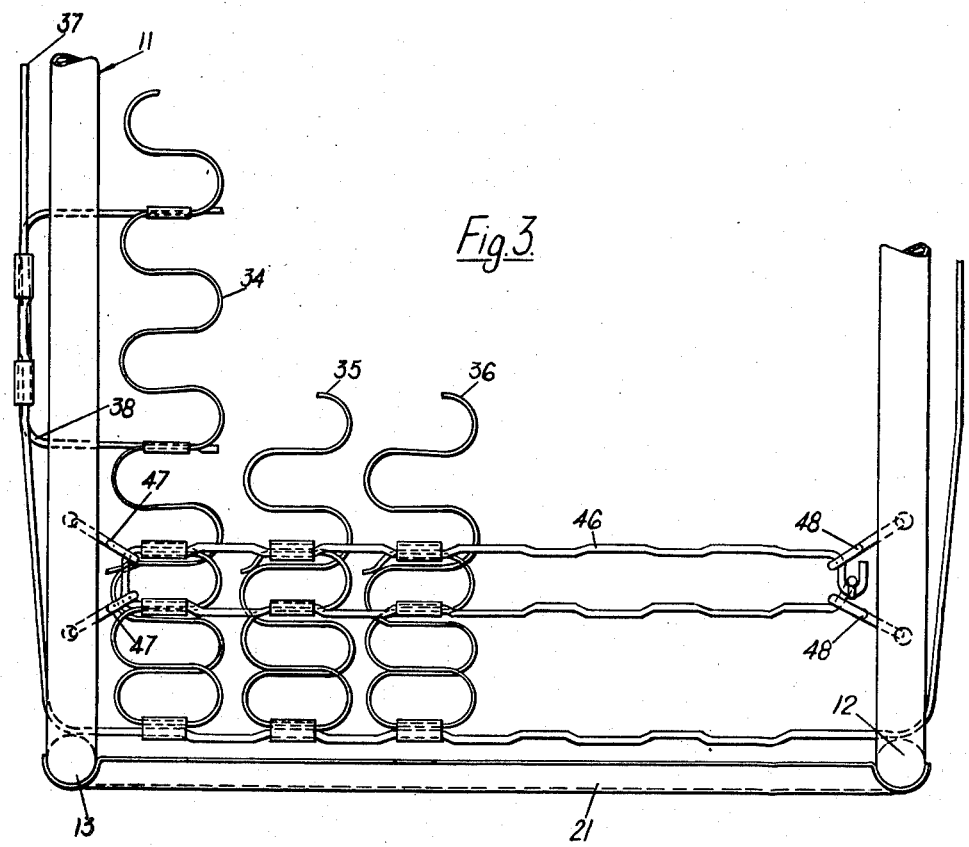

3,189,386
MOTOR VEHICLE SEAT
Ernst Gescheidle, Gross-Gerau, and Rudolf Thier, Russelsheim am Main, Germany, assignors to General Motors Corporation, Detroit, Mich., a corporation of Delaware
Filed May 21, 1962, Ser. No. 196,309
Claims priority, application Germany, May 31, 1961, O 6,014
5 Claims. (Cl. 297—455)

The invention relates to a vehicle seat, particularly having a rigidly arranged back rest. Such seats are generally tiltable about an axis placed at the front edge and they support themselves at the rear end on the floor of the vehicle by a stay at each side. Having regard to emergency braking and to accidents in which persons sitting on the back seat may be hurled forward, these seats are also secured against unintentional forwards tilting. For this purpose, catch devices which lock the front seat with the seat frame are employed.

The frames for the back rests are generally constructed in half-hoop form, that is, the upwardly running spars are joined together at their top end.

For internal safety it is essential that the upper edges of the back rests shall be provided with an adequate layer of cushioning so that in critical situations, passengers who might be possibly thrown on to same are protected from serious bodily injury.

This layer of cushioning is relatively expensive and constitutes a considerable portion of the costs of the seat, particularly in the case of the simpler seat constructions.

In order to reduce the costs for upholstery which is necessary for the reasons described above, when the frame is closed at the top, it is proposed according to the invention that the frame for the back rest shall consist of two separate spars protruding freely upwards and that several spring steel bands are stretched between the spars for springing the surface of the back rest.

The spring steel bands consist of wire rings lying adjacent each other in the plane of the back rest. Whilst having excellent springing properties, the spring steel bands have the advantage of a very flat construction which is of considerable importance for space reasons, particularly in the case of smaller vehicles.

In order to reinforce the upper edge of the back rest, it is further proposed to use a thicker spring steel wire for the upper spring steel bands than for the remaining ones.

With the object of supporting the upwardly protruding spars of the back rest frame, these latter are joined together by a cross strut in the lower region of the back rest.

According to a further feature of the invention, the spring bands for the seat face, which preferably consist of sinusoidally undulating wire springs and run in the longitudinal direction of the seat, are secured at the rear edge of same to a resilient wire loop arranged in the seat frame. The wire loop affords an additional flexibility, thus to a large extent avoiding the risk of completely exhausting the cushioning possibilities of the seat springing under very violent jolts.

The elasticity of the wire loop is attained by an upwardly arched shaping. The sinusoidal wire springs are secured to the wire loop in the usual manner. The latter is suspended at both sides of the seat frame by means of two hooks in each case.

The vehicle seat frame is illustrated by way of example in the drawing in which:

FIGURE 1 gives a side elevation of the seat frame with the seat springing without the back-rest springing, FIGURE 2 is a view of a seat frame seen in the direction of arrow 2 in FIGURE 1 and;

FIGURE 3 is a partial elevation in the direction of the arrow 3 in FIGURE 1, to a larger scale, but omitting the rearward supports.

The supporting mount for the seat consists of a tubular frame construction 11 in the form of a U, the free arms of which 12 and 13 are bent upwards and form the frame for the back rest 14. Forwards, at each side, the frame construction is provided with a support 15 and 16. These are provided with a bore, 17 and 18 respectively, through which the seat may be swung about a pivotal axis. At the rear, the seat is supported by stays, 19 and 20 respectively. Appropriately, the seat is mounted on a rail which can be shifted in a guide (not shown) for the purpose of adjusting the seat.

At the lower region of the back rest, a transverse strut 21 is welded in between the two spars 12 and 13. Between the spars 12 and 13 which project freely upwards, four spring steel bands 22, 23, 24 and 25 are each suspended at either side by means of two hooks 26 to 33. The spring steel bands 22 to 25 are under tension. Under load, the circular rings linking into each other pass into oval shape, adequate spring movement being available for this purpose. The entire tubular frame construction 11, particularly the spars 12 and 13 are so dimensioned, that they in turn make a certain contribution to the overall elasticity, without becoming permanently deformed. The seating surface is sprung in the usual manner by means of undulating spring strips 34, 35 and 36 which are of sinusoidal shape. A peripheral wire 37 which is connected with the outer spring strip 34 by means of the stirrup member 38, runs along the edge of the seat (FIGURE 3). When seen from the side, the spring strips rise slightly towards the front. At the front they are given a somewhat V-shape and they rest on the transversely running portion 39 of the seat frame 11. Attachment for the spring strips is provided by the bar 40 having stamped out channels 41, 42 in which the ends of the spring strips are suspended.

Further bars 43 and 44 are spot welded on to the side edges of the seat frame. These, as well as the front bar 40 comprise a series of downwardly directed lugs e.g. 45. The upholstery material is attached to these lugs in well known manner by means of a rail.

At the rearward end of the seat face, the sinusoidally undulating spring strips 34, 35 and 36 are again brought a little forward by the peripheral wire 37 and support themselves on a transversely tensioned wire loop 46 (FIGURE 3). This wire loop 46 is suspended in the side portions of the seat frame 11 by means of two pairs of hooks 47 and 48. The spring strips 34, 35 and 36 are connected in the usual manner with the wire loop 46. The latter is arched upwards so that it contributes to a certain extent to the flexibility of the seat face. Above all, this flexibility ensure that the passenger does not strike a rigid portion of the frame when the seat deflects under severe vibrations and jolts of the vehicle, such as is possible under certain circumstances with the usual constructions.

The vehicle seat according to the invention offers great seating comfort whilst being of relatively simple construction.

We claim:

1. A vehicle seat having a rigidly-arranged back rest which comprises a back rest frame formed of two separate spars directed freely upwards and spring-steel bands stretched between said spar and consisting of wire rings lying adjacent each other in the plane of said back rest.

2. A vehicle seat having a rigidly-arranged back rest which comprises a back rest frame formed of two separate spars directed freely upwards and a plurality of spring-steel bands stretched one above the other between said spars and consisting of wire rings lying adjacent each other in the plane of said back rest.

3. A vehicle seat according to claim 2, in which an upper one of said spring-steel bands is made of thicker wire than a lower one.

4. A vehicle seat having a rigidly-arranged back rest which comprises a back rest frame formed of two separate spars directed freely upwards, spring-steel bands stretched between said spars and consisting of wire rings lying adjacent each other in the plane of said back rest and a transverse strut connecting said spars adjacent the bottom ends thereof.

5. A vehicle seat back having a pair of upwardly extending frame members integrally formed with a seat frame, a transverse strut rigidly connecting said frame members adjacent their lower ends, the upper portions of said members extending freely above said strut, a plurality of spring-steel bands in the plane of said frame members, means for securing said bands to said frame members, each of said bands having one end secured to one frame member and the other end secured to the other of said members, said bands stretching between said members under tension, and each of said spring-steel bands consisting of a single piece of spring-steel formed as a band of linked rings for resiliently expanding to an oval shape under stress of a load applied generally normal to the plane of said seat back.

References Cited by the Examiner

UNITED STATES PATENTS

| 1,868,279 | 7/32 | Ehlenbeck | 5—246 |
| 1,925,868 | 9/33 | Ehlenbeck et al. | 5—246 |
| 2,169,197 | 8/39 | Reed | 297—455 |

FOREIGN PATENTS

| 322,372 | 12/29 | Great Britain. |
| 662,212 | 12/51 | Great Britain. |

FRANK B. SHERRY, *Primary Examiner.*